United States Patent Office
3,042,703
Patented July 3, 1962

3,042,703
THIOPHOSPHORIC ACID ESTERS AND THEIR PRODUCTION
Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed Sept. 20, 1960, Ser. No. 57,150
Claims priority, application Germany Mar. 22, 1956
17 Claims. (Cl. 260—461)

The present invention relates to new and useful thiophosphoric acid esters and to a process for their production. Generally these new compounds correspond to the following formula:

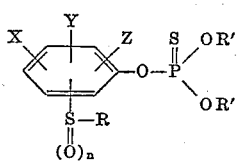

In this formula X, Y and Z denote a hydrogen atom, a hydroxyl group, an alkyl group—especially those having up to 4 carbon atoms, or a aryl group, a halogen atom or a nitro group. R stands for lower alkyl radicals or phenyl radicals, said phenyl may be further substituted by alkyl, halogen or nitro groups and R' stand preferably for low molecular weight alkyl radicals, $n$ stands for zero and 1. The symbol $n$ may also be 2 when X is hydroxy.

The instant application is a continuation-in-part of Serial No. 645,664, filed March 13, 1957; it is also a continuation-in-part of Serial No. 812,584, filed May 12, 1959.

Thiophosphoric acid esters have become more and more important in the field of insecticides, acaricides, miticides etc. during the last years. Thus, it is the principal object of the present invention to provide a new class of phosphoric acid esters, suitable as pesticides or as intermediates for the production of other pesticides. Another object is the preparation of these phosphoric acid esters; still further objects will become apparent as the following description proceeds.

Of particular interest are the compounds of the above shown formula in which X, Y and Z denote a hydrogen atom, an alkyl or aryl group, a halogen atom or a nitro group, at least one of these substituents being one of the aforesaid groups and R and R' stand preferably for low molecular weight alkyl radicals, $n$ stands for zero, 1 or 2.

The sulfide-, sulfoxide- or sulfone-substituent may stand as it is to be seen from the above formula in o-, m- or p-position. In addition to this substituent the phenyl radical may as it is to be seen carry other substituents, identified in the above formula by X, Y and Z. Examples for the alkyl radical attached to the sulfide-, sulfoxy- or sulfone-group are the methyl-, ethyl-, propyl-, butyl-, amyl-group and the like.

The inventive compounds may be prepared by generally known methods, e.g. by reacting the corresponding substituted phenol with the corresponding O.O-dialkylthiophosphoric acid ester chloride with an acid-binding agent. This may be seen from the following reaction scheme using O.O-diethyl-thiophosphoric acid ester chloride and p-methyl-mercapto-o-chloro-phenol as reaction components:

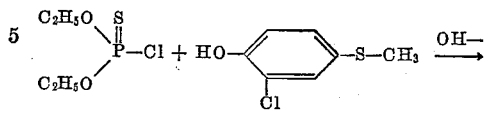

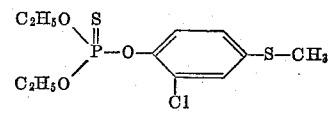

By the same way but using the corresponding sulfoxide- or sulfone-phenol the corresponding sulfoxide- and sulfone-esters may also be obtained. However, these compounds may also successfully be prepared from sulfides by oxidizing them, i.e. with hydrogen peroxide to sulfoxides or with potassium permanganate to sulfones. This may be seen from the following formulae using the end-product of the above shown reaction scheme as starting component:

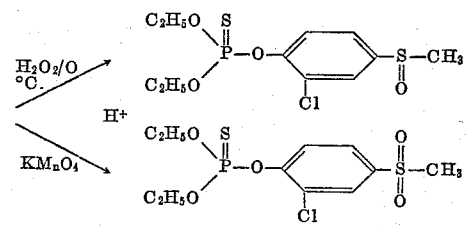

How these reactions may be carried out is more specifically seen from the following examples. Generally the condensation reaction of the phenol and the thiophosphoric acid ester chloride should be carried out in an inert organic solvent such as benzene, toluene, xylene and the like using as an acid-binding agent preferably an alkali metal alcoholate such as sodium ethylate. Another method consists in reacting the alkali metal salt of the appropriate phenol with the corresponding thiophosphoric acid ester chloride in an inert organic solvent. In this case lower ketones such as acetone or methyl ethyl ketone may preferably be used.

If sulfides should be oxidized to sulfoxides, this reaction is preferably carried out by an oxidizing reaction at temperatures at about 0° C. in lower aliphatic carboxylic acids such as acetic acid and using a hydrogen peroxide in a concentration of about 30–40% as a preferred oxidizing agent. The oxidation to the sulfones may be carried out in the same way but using substantially higher temperatures say about 40–50° C. Another method of preparing sulfones, however, is to oxidize sulfides or sulfoxides in an aqueous or aqueous acetonic solution with potassium permanganate at slightly elevated temperatures. All these possibilities are given by illustration only; further known methods may also be chosen for obtaining the inventive novel compounds.

The new phosphoric acid esters exhibit remarkable insecticidal properties against e.g. aphids, flies, mites, lice etc. Generally they may be applied in concentrations from about 0.001% to about 1%, diluted with suitable solid carriers such as talc, chalk, bentonite, clay or liquid carriers such as water, organic solvents etc. Aerosols may also be utilized in the generally known manner, the preferred method of application is to dust or spray such compositions on suitable objects or on plants. Furthermore, some inventive compounds (the sulfides) are valuable intermediates for the production of other insecticidal phosphoric acid esters (the sulfoxides and sulfones).

As a special example for the utility of the inventive compounds the O.O-dimethyl-O-(p-methyl-mercapto-m-cresyl)-thionophosphate and the corresponding sulfoxide of the following formulae:

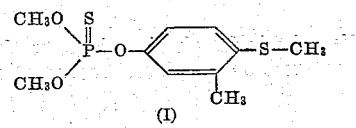

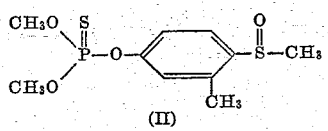

have been tested against red mites. Solutions of these compounds have been prepared by dissolving them in a small amount (about equal) of dimethylformamide, adding 50% of their weight of a commercial emulsifier such as a benzyl hydroxy-diphenyl polyglycol ether (with about 10 to 15 glycol radicals in the chain) and diluting this mixture with water to a concentration of 0.1% respectively 0.01%. Red mites are completely killed with 0.01% solutions of Compound II and to 90% respectively with 0.01% solutions of Compound I.

The present invention may be illustrated by the following examples without, however, being restricted thereto.

Example 1

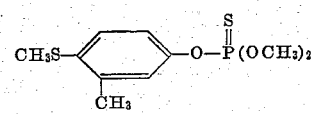

77 grams of p-methyl mercapto-m-cresol are dissolved in 700 cc. of benzene and 0.5 mol of a molar sodium methylate solution are added. After the whole of the benzene and methanol has been azeotropically distilled off, the sodium salt is dissolved in 250 cc. of methyl ethyl ketone and 85 grams of dimethyl-thionophosphoric acid ester chloride are added dropwise at 50° C., the mixture is boiled for an hour, and 134 grams of a pale yellow oil boiling at 105° C./0.01 mm. Hg are thus obtained. Biological activity:

Spider mites are killed to 90% by a 0.01% dilution. On aphids the ester is effective to 70% at the same dilution. The toxicity on rats per os is 250 mg./kg. ($LD_{95}$).

Example 2

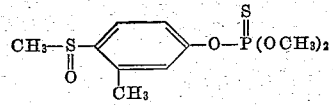

31 grams of p-methyl-(m-cresyl)-sulfoxide are heated with 28 grams of potassium carbonate in 200 cc. of ethyl acetate to 70° C., 36 grams of O.O-dimethyl-thionophosphoric acid ester chloride are added dropwise after 10 minutes at 40–45° C., the mixture is heated under reflux for 2 hours, the slat filtered off after dilution with chloroform, the filtrate is shaken out twice with water, the organic layer dried over sodium sulfate and the solvents are removed under vacuum. After distilling at B.P. 110° C. 0.01 mm. Hg, 51 grams of a pale yellow oil remain. Biological activity:

A 0.01% dilution of the aforesaid ester kills aphids to 80%. Spider mites are completely killed by 0.01% aqueous emulsions. The toxicity on rats per os is 100 mg./kg. ($LD_{50}$).

Example 3

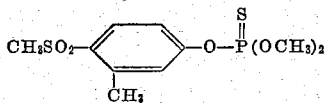

The sodium salt is produced from 27 grams of p-methyl-(m-cresyl)-sulfone according to the instructions of Example 1 and reacted in 200 cc. of methyl ethyl ketone at 60° C. with 32 grams of O.O-dimethyl-thionophosphoric acid ester chloride. After boiling for 1 hour, the product is worked up in known manner and the oil thus obtained chromatographically purified in benzene on a neutral aluminum oxide. After evaporation of the benzene, a colorless crystalline mass remains behind which, after recrystallization from ether, shows a melting point of 74° C.

In a 0.01% solution the aforesaid ester kills spider mites with certainty. Toxicity on rats per os 250 mg./kg. ($LD_{95}$).

By selecting the corresponding reactions the following compounds are obtainable in a similar manner:

| Compound | Toxicity, rats per os ($LD_{50}$), mg./kg. | Biological activity, S=spider mites A=aphids |
|---|---|---|
| $CH_3-S-\underset{CH_3}{\underset{|}{C_6H_3}}-O-\overset{S}{\overset{\|}{P}}(OC_2H_5)_2$ | 100 | S 0.0001, 60%. A 0.01, 95%. |
| $CH_3-\underset{O}{\overset{\|}{S}}-\underset{CH_3}{\underset{|}{C_6H_3}}-O-\overset{S}{\overset{\|}{P}}(OC_2H_5)_2$ | 50 | S 0.001, 60%. A 0.001, 30%. |
| $CH_3SO_2-\underset{CH_3}{\underset{|}{C_6H_3}}-O-\overset{S}{\overset{\|}{P}}(OC_2H_5)_2$ | 50 | S 0.001, 40%. A 0.01, 50%. |
| $CH_3-S-\underset{CH_3}{\underset{|}{C_6H_3}}-O-\overset{S}{\overset{\|}{P}}(OCH_3)_2$ | 500 | A 0.01, 100%. |
| $Cl-\underset{SCH_3}{\underset{|}{C_6H_3}}-O-\overset{S}{\overset{\|}{P}}(OC_2H_5)_2$ | 25 | S 0.001, 100%. A 0.1, 90%. |
| $(CH_3)_3C-\underset{SCH_3}{\underset{|}{C_6H_3}}-O-\overset{S}{\overset{\|}{P}}(OCH_3)_2$ | [1] 250 | S 0.01, 98%. A 0.001, 40%. |
| $(CH_3)_3C-\underset{SCH_3}{\underset{|}{C_6H_3}}-O-\overset{S}{\overset{\|}{P}}(OC_2H_5)_2$ | 50 | S 0.001, 80%. |
| $CH_3-S-\underset{Cl}{\underset{|}{C_6H_3}}-O-\overset{S}{\overset{\|}{P}}(OC_2H_5)_2$ | 25 | S 0.0001, 80%. A 0.001, 50%. |
| $CH_3-S-\underset{Cl}{\underset{|}{C_6H_3}}-O-\overset{S}{\overset{\|}{P}}(OCH_3)_2$ | 50 | S 0.001, 98%. A 0.01, 50%. |
| $CH_3-S-\underset{Cl}{\underset{|}{C_6H_3}}-O-\overset{S}{\overset{\|}{P}}(OC_2H_5)_2$ | [1] 10 | S 0.0001, 80%. A 0.001, 100%. |
| $CH_3S-\underset{Cl}{\overset{CH_3}{\underset{|}{C_6H_2}}}-O-\overset{S}{\overset{\|}{P}}(OC_2H_5)_2$ | 100 | S 0.001, 90%. A 0.001, 100%. |

| Compound | Toxicity, rats per os (LD₅₀), mg./kg. | Biological activity, S=spider mites A=aphids |
|---|---|---|
| 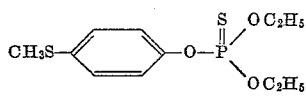 | 10 | S 0.001, 40%. A 0.01, 40%. |
| 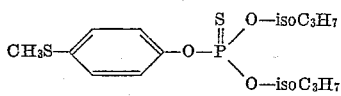 | 25 | S 0.001, 98%. A 0.001, 100%. |
| 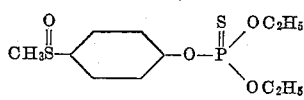 | 25 | S 0.001, 98%. A 0.001, 40%. |

[1] LD₉₅.

*Example 4*

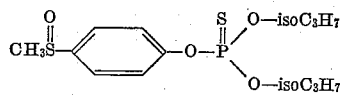

83 grams of finely divided potash and 1 gram of pulverized copper are added to a solution of 83.5 grams of p-methylmercaptophenol in 300 cc. of benzene. The mixture is heated with stirring up to 65° C. and 140 grams of O.O-diethylthiono phosphoric acid chloride are slowly added dropwise at this temperature without cooling. The temperature spontaneously rises to 80° C. The mixture is kept at boiling temperature for another hour, the inorganic salts are filtered off with suction and the benzene solution is washed several times with diluted ammonia and water. After drying over sodium sulphate and distilling off the solvent, 163 grams of the new ester are obtained (yield: 98% of the theoretical). The ester boils at 111° C. under a pressure of 0.01 mm./Hg.

*Example 5*

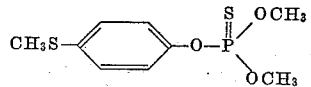

A solution of 59 grams of p-methylmercaptophenol in about 100 cc. of benzene is added dropwise to a sodium ethylate solution which corresponds to a sodium content of 0.4 mol. The alcohol is distilled off by repeated addition of benzene and a suspension of the sodium salt in benzene is finally obtained. The suspension is heated to 60° C. and 90 grams of O.O-diisopropylthiono-phosphoric acid chloride are rapidly added dropwise. The mixture is then kept at boiling temperature for another 2 hours with stirring and cooling at the reflux. The inorganic salts are separated off by filtering with suction and the benzene layer is shaken several times with water and diluted sodium bicarbonate solution. After separating, the benzene solution is dried over sodium sulphate, the benzene distilled off in vacuum and the crude product distilled in high vacuum at 0.01 mm./Hg and a bath temperature of 108° C. 120 grams of the new ester (91% of the theoretical) of the boiling point 108° C. under 0.01 mm./Hg are obtained.

*Example 6*

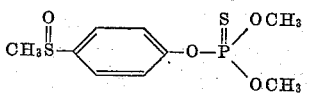

0.5 cc. of 50% sulphuric acid is added to a solution in 70 cc. of methanol of 36.5 grams (0.125 mol) of the ester obtained according to Example 1 and 11.25 cc. of a 37.8% hydrogen peroxide solution is added dropwise at 40 to 45° C. The reaction proceeds exothermally. After the oxidation is complete, the solution is stirred at 50° C. for another hour, neutralized with prepared chalk and filtered. The water and the methanol are azeotropically distilled off with benzene. A light yellow, viscous oil remains behind in a quantity of 38 grams which corresponds to a yield of 99% of the theoretical. The sulphoxide boils at 140 to 141° C. under a pressure of 0.01 mm./Hg.

*Example 7*

$$CH_3S-\text{\textlangle}\text{\textrangle}-O-P(S)(O-isoC_3H_7)_2$$

21.5 cc. of a 37.8% hydrogen peroxide solution are added dropwise at 40° C. to a solution of 69 grams of the ester obtainable according to Example 2, which is dissolved in 100 cc. of methanol, and 1 cc. of 50% sulphuric acid. The mixture is then stirred at 55° C. for another hour. The solution is neutralized by adding prepared chalk. The reaction mixture is filtered off with suction and solvents are removed by distillation in vacuum. The crude product thus obtained is distilled off in high vacuum at a pressure of 0.01 mm./Hg and a bath temperature of 130° C. 72 grams of the new ester are obtained which corresponds to yield of 99% of the theoretical.

*Example 8*

A solution of 140 grams of p-methylmercaptophenol in 1000 cc. of benzene is added to a sodium methylate solution which corresponds to a content of 1 mol of sodium. The methanol is distilled off by the repeated addition of benzene so that a suspension of sodium salt in benzene is finally obtained. After adding 0.5 gram of pulverized copper, the suspension is heated to 70° C. and 200 grams of O.O-dimethylthiono-phosphoric acid chloride are rapidly added dropwise. The mixture is then refluxed for 1 hour with stirring. After cooling the mixture is shaken several times with water and diluted sodium bicarbonate solution and the benzene solution is dried over sodium sulphate. The benzene is distilled off in vacuum and the crude product distilled in high vacuum at 0.01 mm./Hg and a bath temperature of 130° C. 260 grams (98% of the theoretical) of the new ester of the formula $$CH_3S-\text{\textlangle}\text{\textrangle}-O-P(S)(OCH_3)_2$$

(boiling point 108° C. at 0.01 mm./Hg) are obtained. Density: $d_4^{20}=1.266$. Refractive index: $n_D^{20}=1.5710$. Toxicity: rat per os 25 mg./kg.

A solution of 11.25 cc. of 37.8% of hydrogen peroxide in 50 cc. of glacial acetic acid is added dropwise at 0 to 10° C. to a solution of 33 grams of the resulting ester in 100 cc. of glacial acetic acid. After the reaction is complete the solution is stirred at room temperature for another 2 hours. Thereupon the solution is shaken several times with benzene and water and neutralized with diluted bicarbonate solution. The benzene solution is dried over sodium sulphate and the solvent distilled off in vacuum. The remaining colourless oil is distilled in high vacuum under a pressure of 0.01 mm./Hg and a bath temperature of 100° C. 34.5 grams (97% of the theoretical) of a colorless oil are thus obtained. The compound has the following formula:

$$CH_3S(O)-\text{\textlangle}\text{\textrangle}-O-P(S)(OCH_3)_2$$

Density: $d_4^{20}=1.315$. Refractive index: $n_D^{20}=1.5648$. Toxicity: rat per os 25 mg./kg.

*Example 9*

80 grams of O.O-dimethylthiono-phosphoric acid chloride are added dropwise at 35° C. to a solution of 59 grams (0.25 mol) of the sodium salt of p-methyl-sulphonylphenol in 300 cc. of ethylmethyl ketone. The reaction temperature spontaneously rises to 50° C. The mixture is kept at this temperature for another 2 hours, the precipitated sodium chloride is filtered off with suction and the filtrate is shaken several times with ether and water and at last with diluted sodium bicarbonate solution. After drying over sodium sulphate, the solvents are distilled off in vacuum and the remaining colourless oil is distilled in high vacuum under a pressure of 0.01 mm./Hg and a bath temperature of 120° C. 73 grams (99% of the theoretical) of the new ester of the following formula are obtained:

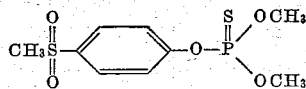

Density: $d_4^{20}=1.327$. Refractive index: $n_D^{20}=1.5684$. Toxicity: rat per os 25 mg./kg.

Example 10

60 grams of p-methylsulphonylphenol and 1000 cc. of benzene are added to a sodium methylate solution having a sodium proportion which corresponds to 0.35 mol. The methanol is distilled off by repeated addition of benzene so that a suspension of the sodium salt in benzene is finally obtained. The benzene suspension is concentrated in vacuum to about 100 cc. and the salt paste is dissolved by adding 200 cc. of ethylmethyl ketone, and 70 grams of O.O-diethylthiophosphoric acid chloride are added dropwise to the solution at 60° C. The solution is refluxed for another hour and the reaction mixture is shaken several times with water after addition of benzene, the benzene solution is dried over sodium sulphate, and the solvents are distilled off in vacuum. The remaining colorless oil is distilled in high vacuum under a pressure of 0.01 mm./Hg and a bath temperature of 120° C. 108 grams (95.5% of the theoretical) of the new ester of the formula

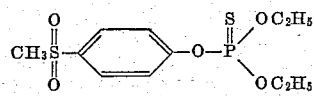

are obtained. Density: $d_4^{20}=1.270$. Refractive index: $n_D^{20}=1.5542$. Toxicity: rat per os 10 mg./kg.

Example 11

A solution of 96 grams of the ester obtained according to Example 2 in 100 cc. of acetone is added dropwise while cooling at 30 to 40° C. to a suspension of 66 grams (0.42 mol) of potassium permanganate and 64 grams (0.26 mol) of magnesium sulphate in 300 cc. of water and 300 cc. of acetone. After the reaction is complete the mixture is stirred at 50° C. for another hour and sulphur dioxide is introduced into the reaction mixture while cooling with ice-water until complete decoloration occurs. After adding chloroform, the mixture is shaken several times with water and finally with diluted sodium bicarbonate solution. The chloroform solution is then dried over sodium sulphate and the solvents are distilled off. The resulting colorless oil is distilled in high vacuum under a pressure of 0.01 mm./Hg and a bath temperature of 120° C. 87 grams (75% of the theoretical) of the new ester of the formula

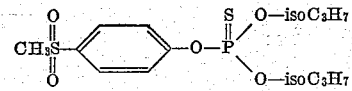

are obtained. Density: $d_4^{20}=1.211$. Refractive index: $n_D^{20}=1.5311$. Toxicity: rat per os 50 mg./kg.

Example 12

(a) A solution of 462 grams (3 mols) of p-ethylmercapto-phenol in 2.5 litres of benzene is poured into a sodium ethylate solution having a sodium proportion which corresponds to 3 mols. The alcohol is distilled off by repeated addition of benzene so that a suspension of the sodium salt in benzene is finally obtained. 600 grams (excess) of O.O-diethylthiono-phosphoric acid chloride are added dropwise up to a temperature of 75° C. The reaction mixture is kept at boiling temperature for another 3 hours and shaken several times with water and diluted sodium bicarbonate solution. The benzene solution is dried with sodium sulphate and the solvent is distilled off in vacuum. 880 grams (96% of the theoretical) of the new ester of the formula

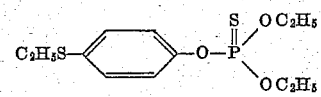

are obtained. The ester distills as a colourless oil at 102° C. under a pressure of 0.01 mm./Hg. Density: $d_4^{20}=1.162$. Refractive index: $n_D^{20}=1.5441$. Toxicity: rat per os 10 mg./kg.

(b) 45 cc. of a 38.7% hydrogen peroxide solution in 100 cc. of glacial acetic acid are added dropwise at a temperature of 0–10° C. to a solution of 153 grams (½ mol) in 300 cc. of glacial acetic acid of the ester obtained as described in the preceding paragraph. After the reaction is completed the mixture is left standing at room temperature overnight and the acetic acid is distilled off for the most part in vacuum. The residue is treated with ether and the solution shaken several times with water and diluted sodium bicarbonate solution. Thereupon the ethereal layer is dried over sodium sulphate and the solvent distilled off in vacuum. The remaining colourless oil is distilled under a pressure of 0.01 mm./Hg and a bath temperature of 100° C. 160 grams (99% of the theoretical) of the new ester of the formula

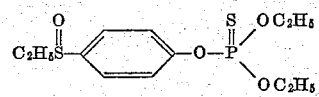

are thus obtained. Density: $d_4^{20}=1.217$. Refractive index: $n_D^{20}=1.5459$. Toxicity: rat per os 10 mg./kg.

(c) 90 cc. of a 37.8% hydrogen peroxide solution in 150 cc. of glacial acetic acid are added dropwise at 30 to 40° C. to a solution of 153 grams (0.5 mol) of the ester obtained as described in the preceding Example 9 in 300 cc. of glacial acetic acid. After the reaction is complete the mixture is stirred at 60° C. for 1 hour, left standing overnight, the glacial acetic acid is distilled off for the most part in vacuum and the residue diluted with ether. After shaking several times with water and diluted sodium bicarbonate solution, the ethereal layer is dried over sodium sulphate and the solvent distilled off in vacuum. 169 grams (100% of the theoretical) of the new ester are obtained as colourless oil, which is distilled under a pressure of 0.01 mm./Hg and a bath temperature of 120° C. The compound has the following formula

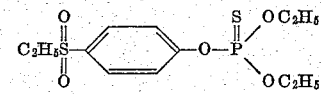

Density: $d_4^{20}=1.243$. Refractive index: $n_D^{20}=1.5361$. Toxicity: rat per os 25 mg./kg.

Example 13

A solution of 154 grams (1.1 mol) of m-methylmercapto-phenol in 1000 cc. of benzene is poured into a sodium methylate solution which corresponds to a sodium content of 1.1 mols. The methanol is distilled off by addition of benzene in such a manner that a suspension of sodium salt in benzene is finally obtained. 220 grams of O.O-diethylthionophosphoric acid chloride is rapidly added dropwise at 70° C. with stirring. The reaction mixture is refluxed for 4 hours and then shaken several times with water and diluted sodium bicarbonate solution. The benzene layer is dried over sodium sulphate and the solvent distilled off in vacuum. The new ether of the formula

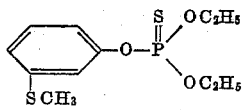

boils at 102° C. under a pressure of 0.01 mm./Hg. 300 grams (93.5% of the theoretical) are obtained as a colourless oil. Density: $d_4^{20}=1.196$. Refractive index: $n_D^{20}=1.5528$. Toxicity: rat per os 100 mg./kg.

A solution of 46 grams of the ester, obtained as described above, in 100 cc. of acetone is added dropwise at 30 to 40° C. to a solution of 34 grams of potassium permanganate and 40 grams of magnesium sulphate in 150 cc. of water and 150 cc. of acetone. After the reaction is complete, the mixture is heated to 60° C. for one hour, sulphuric dioxide is introduced with cooling until complete decolouration occurs. The mixture is then mixed with chloroform and shaken several times with water and diluted sodium bicarbonate solution. The chloroform layer is dried over sodium sulphate and the solvent is distilled in high vacuum under a pressure of 0.01 mm./Hg and a bath temperature of 120° C. 46 grams (91% of the theoretical) of the new ester of the formula

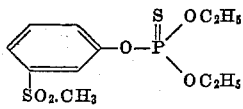

are obtained. Density: $d_4^{20}=1.258$. Refractive index: $n_D^{20}=1.5359$. Toxicity: rat per os 50 mg./kg.

*Example 14*

A solution of 49 grams (0.35 mol) of m-methylmercaptophenol in 500 cc. of benzene is added to a sodium methylate solution the sodium content of which corresponds to 0.35 mol. The methanol is distilled off by repeated addition of benzene so that a suspension of the sodium salt in benzene is finally obtained. The benzene is expelled in vacuum except a residue of about 100 cc. and the remaining salt paste is dissolved in 150 cc. of ethyl methyl ketone. At 50° C. 64 grams of O.O-dimethyl thionophosphoric acid chloride is added dropwise with cooling and the mixture is subsequently heated to boiling temperature for 15 minutes. Benezne is added and the mixture is shaken several times with water. The benzene layer is dried over sodium sulphate and the solvent distilled off in vacuum. Under a pressure of 0.01 mm. Hg the distillation yields 90 grams (97% of the theoretical) of the new ester of the formula

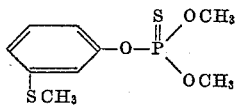

of the boiling point 92° in form of a colourless oil. Density: $d_4^{20}=1.257$. Refractive index: $n_D^{20}=1.5692$. Toxicity: rat per os 500 mg./kg.

*Example 15*

A solution of 46 grams (0.33 mol) of o-methylmercaptophenol in 500 cc. of benzene is run into a sodium methylate solution which corresponds to a sodium content of 0.33 mol. The methanol is distilled off in such a manner that a suspension of the sodium salt in benzene is finally obtained. 100 cc. of ethyl methyl ketone are added to the salt paste and 90 grams of O.O-diethyl-thionophosphoric acid chloride are rapidly added in drops at 70° C. The mixture is kept at boiling temperature for another hour. After standing overnight the sodium chloride is separated off by filtering with suction and the filtrate is shaken several times with water and diluted sodium bicarbonate solution. The benzene layer is dried over sodium sulphate and the solvent is filtered off in vacuum. 95 grams (99% of the theoretical) of the colourless new ester of the formula

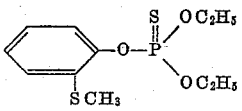

are obtained. The ester boils at 102° C. under a pressure of 0.01 mm. Hg. Density: $d_4^{20}=1.206$. Refractive index: $n_D^{20}=1.5550$. Toxicity: rat per os 100 to 250 mg./kg.

A solution of 41.5 grams (0.14 mol) of the resulting ester in acetone is rapidly added dropwise at 30 to 40° C. to a suspension of 33 grams of potassium permanganate and 38 grams of magnesium sulphate in 150 cc. of water and 100 cc. of acetone. The mixture is stirred at room temperature for several hours and sulphur dioxide is then introduced with cooling until complete decolouration occurs. After addition of 200 cc. of chloroform, the mixture is shaken several times with water and finally with diluted sodium bicarbonate solution, the chloroform layer dried and the solvent filtered off in vacuum. 45 grams (99% of the theoretical) of the new ester of the formula

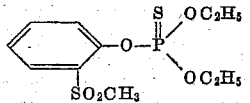

are obtained in form of colourless crystals of the melting point of 66° C.

*Analysis.*—Calculated for the molecular weight, 324.4: P, 9.56%; S, 19.77%; S—Br, 9.87%. Found: P, 9.14%; S, 19.66%; S—Br, 9.75%.

*Example 16*

38 grams (60.2 mol) of phenol-o-methyl sulphoxide and 500 cc. of benzene are added to a sodium methylate solution which corresponds to a sodium content of 0.2 mol. The methanol is filtered off in such a manner that a suspension of the sodium salt in benzene is finally obtained. 100 cc. of ethyl methyl ketone are introduced and 40 grams of O.O-diethyl-thionophosphoric acid chloride are rapidly added dropwise at 70° C. The reaction mixture is refluxed with stirring for 3 hours and left standing overnight. After addition of 300 cc. of benzene the mixture is shaken several times with water and the benzene layer is dried over sodium sulphate. The solvent is filtered off in vacuum. After distilling under a pressure of 0.01 mm. Hg and a bath temperature of 70° C., 60.5 grams (98% of the theoretical) of the new ester of the formula

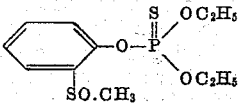

are obtained in form of a colourless oil. Density: $d_4^{20}=1.242$. Refractive index: $n_D^{20}=1.5449$. Toxicity: rat per os 100 mg./kg.

*Example 17*

142 grams (½ mol) of 2.5-dihydroxyphenyl-4'-chlorophenylsulphone are dissolved in 1000 cc. of acetonitrile at 70° C. and 36 grams of finely pulverized potassium cyanide are added and the mixture is stirred with heating for one hour. 100 grams of O.O-diethyl-thionophosphoric acid chloride are rapidly added dropwise at 82° C. and the mixture is subsequently refluxed for 5 hours. After standing for some time, 1.5 litres of ether are added and the reaction mixture is shaken several times with water. The ethereal layer is dried over sodium sulphate.

After distilling off the solvent 204 grams of the new ether of the formula

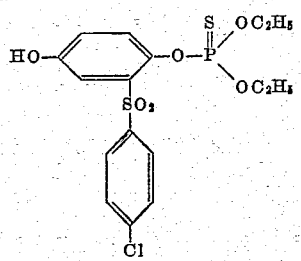

are obtained in form of a crystalline mass. M.P. 105° C. after recrystallisation from toluene.

Analysis.—Calculated for the molecular weight, 420.9: P, 6.65%; S, 13.73%; Cl, 7.59%. Found: P, 6.26%; S, 13.45%; Cl, 7.78%. Toxicity: rat per os 1000 mg./kg.

*Example 18*

101 grams of 2.5-dihydroxy-phenyl-ethyl sulphone (M.P. 103° C.) are added to a sodium methylate solution which corresponds to a sodium content of 0.5 mol, and the methanol is distilled off in vacuum to dryness. 800 cc. of ethyl methyl ketone are introduced and 100 grams of O.O-diethyl-thionophosphoric acid chloride are added dropwise at 76° C. After boiling for 6 hours the mixture is mixed with ether and washed several times with water. The ethereal layer is dried over sodium sulphate and the solvent distilled off in vacuum. The remaining oil is distilled under a pressure of 0.01 mm./Hg and a bath temperature of 120° C. 157 grams (89% of the theoretical) of the new ester of the formula

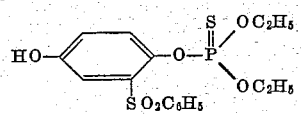

are obtained in form of a viscous oil.

Analysis.—Calculated for the molecular weight, 354.4: P, 8.76%; S, 18.06%; S—Br, 9.04%. Found: P, 9.07%; S, 17.70%; S—Br, 9.53%. Toxicity: rat per os 1000 mg./kg.

What is claimed is:

1. A compound of the formula

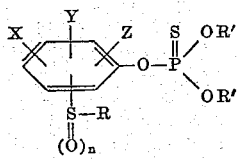

wherein X, Y and Z stand for a member selected from the group consisting of hydrogen, hydroxy, lower alkyl having up to 4 carbon atoms, chlorine and nitro groups, R stands for a member selected from the group consisting of an alkyl radical having up to 4 carbon atoms and chlorophenyl, R' stands for an alkyl radical having up to 4 carbon atoms, and $n$ is a number selected from the group consisting of zero and 1.

2. A compound of claim 1 wherein Y and Z are each hydrogen.

3. A compound of the formula

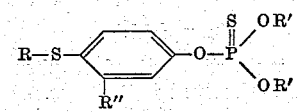

wherein R and R' stand for low molecular alkyl radicals up to 4 carbon atoms, and R'' stands for chlorine.

4. A compound of the formula

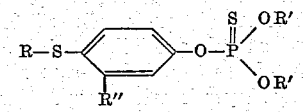

wherein R, R' and R'' stand for alkyl radicals having up to 4 carbon atoms.

5. A compound of the formula

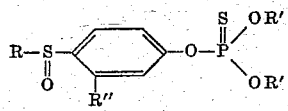

wherein R and R' stand for low molecular alkyl radicals up to 4 carbon atoms, and R'' stands for chlorine.

6. A compound of the formula

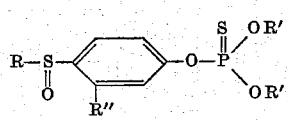

wherein R, R' and R'' stand for alkyl radicals having up to 4 carbon atoms.

7. The compound of the following formula

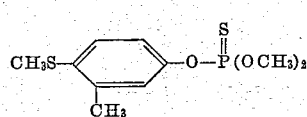

8. The compound of the following formula

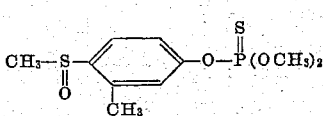

9. The compound of the following formula

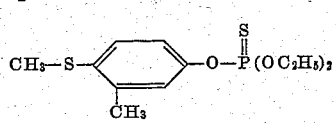

10. The compound of the following formula

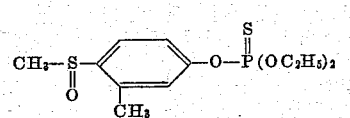

11. The compound of the following formula

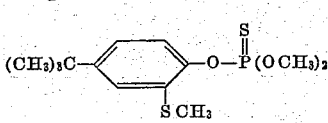

12. The compound of the following formula

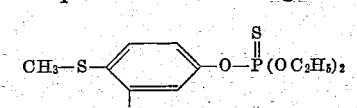

13. The thiophosphoric acid ester of the following formula

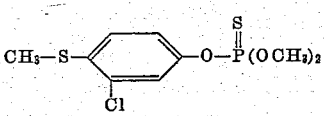

14. The thiophosphoric acid ester of the following formula

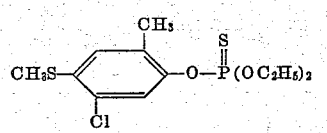

15. The thiophosphoric acid ester of the following formula
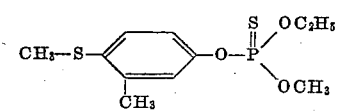
16. The thiophosphoric acid ester of the following formula
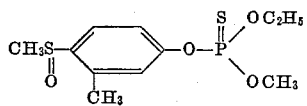
17. A compound of the formula
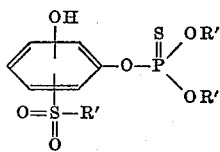
wherein R' stands for an alkyl radical having up to 4 carbon atoms.
References Cited in the file of this patent
FOREIGN PATENTS
257,649     Switzerland _____ May 2, 1949
OTHER REFERENCES
Fukuto et al.: (II) "J. Agr. Food Chem.," vol. 4, pp. 930–935 (November 1956).